US011663768B2

(12) United States Patent
Gargus et al.

(10) Patent No.: US 11,663,768 B2
(45) Date of Patent: May 30, 2023

(54) MULTI-PROCESS COMPOSITOR

(71) Applicant: Google LLC, Mountain View, CA (US)

(72) Inventors: Joshua Gargus, Mountain View, CA (US); Jeffrey Brown, Mountain View, CA (US); Michael Jurka, Los Altos, CA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 17/327,860

(22) Filed: May 24, 2021

(65) Prior Publication Data

US 2021/0279937 A1   Sep. 9, 2021

Related U.S. Application Data

(63) Continuation of application No. 16/388,255, filed on Apr. 18, 2019, now Pat. No. 11,049,312.

(60) Provisional application No. 62/676,516, filed on May 25, 2018.

(51) Int. Cl.
*G06T 15/00* (2011.01)
*G06T 15/50* (2011.01)

(52) U.S. Cl.
CPC .......... *G06T 15/005* (2013.01); *G06T 15/503* (2013.01)

(58) Field of Classification Search
None
See application file for complete search history.

(56) References Cited

U.S. PATENT DOCUMENTS

| | | | |
|---|---|---|---|
| 2003/0236800 A1* | 12/2003 | Goeltzenleuchter | G06F 11/1492 |
| 2014/0313197 A1* | 10/2014 | Peuhkurinen | G06T 17/05 345/426 |
| 2015/0106906 A1 | 4/2015 | Kwok | |
| 2015/0317026 A1 | 11/2015 | Choi et al. | |
| 2019/0103945 A1* | 4/2019 | Medles | H04L 1/1812 |

\* cited by examiner

*Primary Examiner* — Tapas Mazumder
(74) *Attorney, Agent, or Firm* — Botos Churchill IP Law

(57) ABSTRACT

This technology relates to rendering content from discrete applications. In this regard, one or more computing devices may receive a global scene graph containing resources provided by two or more discrete processes, wherein the global scene graph is instantiated by a first process of the two or more discrete processes. The one or more computing devices may render and output for display, the global scene graph in accordance with the resources contained there.

20 Claims, 11 Drawing Sheets

300

MULTI-PROCESS COMPOSITOR

CROSS-REFERENCE TO RELATED APPLICATION

The present application is a continuation of U.S. patent application Ser. No. 16/388,255, filed Apr. 18, 2019, which claims the benefit of the filing date of U.S. Provisional Patent Application No. 62/676,516 filed May 25, 2018, the disclosures of which are hereby incorporated herein by reference.

BACKGROUND

Graphic compositing combines content from one or more sources into a single image. Compositing is generally a function of a system's compositor. Typical compositors receive content from one or more processes and layer the content into a single image. In this regard, each frame that is displayed to the user results from a two-step process, where the system compositor receives images that are rendered by various processes. First, the system compositor applies image-processing techniques to the previously rendered images received from the respective processes, such as blurring, blending, or otherwise manipulating the images. Second, the system compositor displays the resulting image of the combined content.

SUMMARY

The technology relates to a multi-process compositor capable of placing and rendering 2D and 3D content from discrete processes within a global scene graph. The multi-process compositor may communicate with the discrete processes using unique, secure communication channels. Through these channels, the discrete processes may direct the creation of a global scene graph and provide content for the global scene graph. The multi-process compositor may then render the content within the global scene graph with a physically based renderer such that content from one process may realistically affect the appearance of other content from the same and/or other processes.

One aspect of the disclosure provides a method for rendering content from discrete applications. The method includes receiving, by one or more computing devices, a global scene graph containing resources provided by two or more discrete processes, wherein the global scene graph is instantiated by a first process of the two or more discrete processes; and rendering and outputting for display, by the one more computing devices, the global scene graph in accordance with the resources contained therein.

In some instances, the resources contain three-dimensional (3D) content. In some examples, the rendering of the resources is performed by a physically based renderer.

In some instances the global scene graph is generated in a multi-process compositor. In some examples, the multi-process compositor communicates with the two or more discrete processes via discrete communication channels.

In some instances, the first process requests at least one resource from a second process of the two or more discrete process. In some examples a resource linker generates a secure communication channel between the first process and the second process; and upon receiving the requested at least one resource from the second process, the resource linker creates an arc link between at least one resource provided by the first process and the requested at least one resource from the second process.

Another aspect of the disclosure provides a non-transitory computer readable medium storing instructions. The instructions, when executed by one or more processors, cause the one or more processors to perform the steps of: receiving a global scene graph containing resources provided by two or more discrete processes, wherein the global scene graph is instantiated by a first process of the two or more discrete processes; and rendering and outputting for display, the global scene graph in accordance with the resources contained therein.

Another aspect of the disclosure provides a system for rendering content from discrete applications. The system comprises: one or more computing devices; and memory storing instructions. The instructions are executable by the one or more computing devices to render the content from the discrete applications, wherein the instructions comprise: receiving a global scene graph containing resources provided by two or more discrete processes, wherein the global scene graph is instantiated by a first process of the two or more discrete processes; and rendering and outputting for display, the global scene graph in accordance with the resources contained therein.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

This technology relates to a multi-process compositor which positions two-dimensional (2D) and three-dimensional (3D) content into a global scene graph and renders the content in a unified lighting environment. Compositors receive content, such as graphics data from discrete processes and combine the content into a scene graph. The content in the scene graph is then rendered for display. However, a typical compositor may only receive two-dimensional representations of the content, with three-dimensional content generated by the processes being pre-rendered into two-dimensional representations prior to being passed to the compositor. Such compositors are unable to render the content in a way that 3D content from one process is capable of realistically casting shadows or emitting light that affects the appearance of the other processes. Moreover, as all content received from the processes is pre-rendered, content cannot be ordered such that it properly occludes other content in 3D space.

To address these issues, a multi-process compositor capable of placing and rendering 2D and 3D content from discrete processes within a global scene graph is provided as discussed herein. The multi-process compositor may use a renderer, such as a physically based renderer (PBR), which is capable of realistically rendering the content within the global scene graph such that the shadows cast, light emitted, and light reflected by content from one process may affect the appearance of other content from the same and/or other processes. In other words, instead of each process rendering its own content into a 2D image, processes insert content into a global scene graph of the multi-process compositor, which is then rendered by the renderer. In some instances, the PBR may be capable of stylized or expressive rendering, such as, for example, rendering which applies effects and processing which result in a cartoon or non-photorealistic type appearance. Although examples described herein describe the use of processes interacting with the multi-process compositor to generate a global scene graph, applications and/or services may also interact with the multi-process compositor to generate the global scene graph.

The global scene graph is a hierarchical data structure, such as a data tree, which is comprised of a plurality of nodes connected by arcs. In this regard, the global scene graph may be defined based on the positions of the nodes and their various arc connections. For instance, a node containing content connected by an arc to a camera node may result in the content within the node being rendered from the perspective of the angle of the camera assigned to the camera node. More generally, the global scene graph defines what and how content is rendered and output for display.

Figure 3:
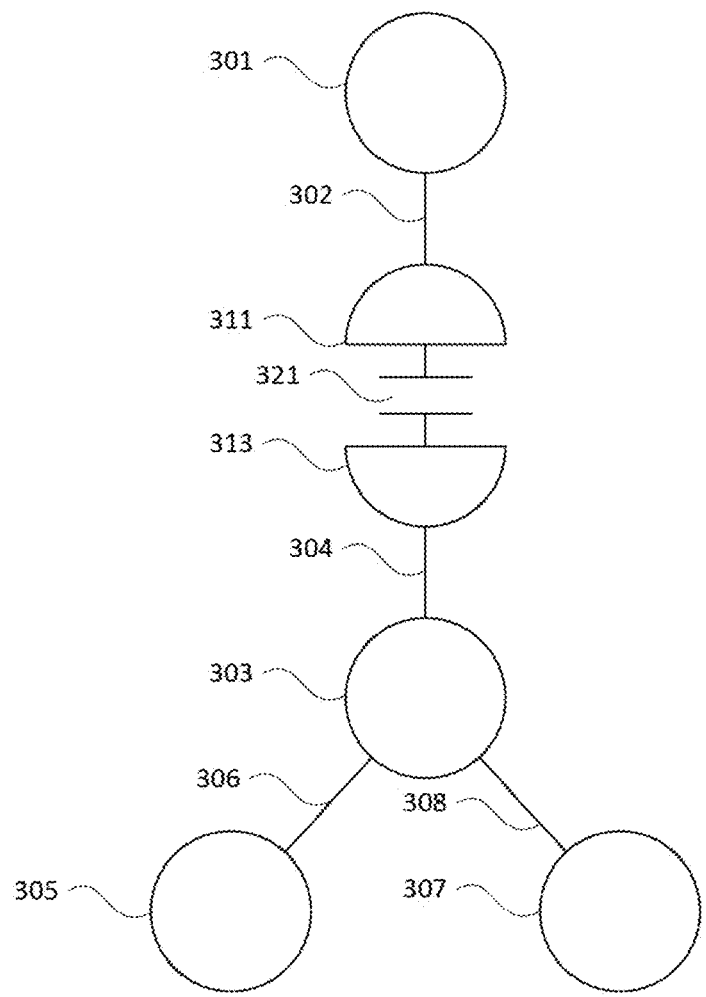
FIG. 3 is an example global scene graph in accordance aspects of the disclosure.

Each node may represent a resource, such as an object, portion of an object, effect, etc. The resources may include spatial regions, cameras, shapes, specialized shapes, materials, lights, content nodes (i.e., where content may be inserted), audio, animations (e.g., visual effects), etc. Each arc may represent a relationship between the connected nodes. For instance, FIG. 3 show a global scene graph 300 including a plurality of resources 301, 303, 305, and 307, as well as space holder 311 and space 313 resources. Arcs, including arc 302 connecting resources 301 and space holder 311, arc 304 connecting space 313 and 303, and arcs 306 and 308 connecting resource 303 with resources 305 and 307, respectively are also shown. In addition, a linking arc 321 connects space holder 311 and space 313.

Other resources may include simulations, variables, physical devices, compositors, and layers. Simulation resources may include particle systems, fluid simulations, such as water or smoke, or any other physical or rule based simulations.

Variable resources may provide properties and values to Application Programming Interfaces (APIs). In this regard, a resource may expose APIs which allow their properties to be controlled in various ways, such as setting the color and brightness of a light, the speed and path of an animation, the viscosity of a simulated fluid, etc. Each variable may a type, such as color, direction, 4×4 matrix, integer, string, etc.

Any property of a variable resource may be set to a variable of matching type. Typically, it is the process that owns a variable resource that directly sets such properties and values. However, through the multi-process compositor, a resource owner may define a property or value as a variable, and request that another process define the value or property. This allows aspects of a resource to be controlled by another process without directly providing access to that other process. As such, the other process provides a variable to the resource owning process, which sets the resource-property's value to that variable. By doing such, security is maintained, as the other process is not provided full access to an API or other components of the resource owner.

Physical device resources may represent a display device on which a portion, or the entire global scene graph, is rendered. For instance, the physical device may be a physical monitor attached to the system. In some instances the physical device resource may be a privileged resource. In this regard, only certain processes, such as a head process and/or certain sub-processes, as described below, may be able to instance the physical device resource.

Layer resources may represent layers portions of the global scene graph and the compositor may render each layer resource. In this regard, the compositor resource may be attached to a physical device resource onto which the layer resources may be rendered. In some instances, specific layer resources may be generated including a scene layer, digital rights management (DRM) layer, and layer stack. The scene layer resource may be a layer on which another resource may be attached. The DRM layer may be a layer capable of handling protected video content, such as encrypted movie files. The layer stack may provide a connection point for other layer resources. In some instances, the layer resources may also be used by the multi-process compositor to detect and manage input handling.

The features described herein allow for processes to share a global 3D scene graph. As such, content from discrete processes may be rendered in a unified lighting environment, thereby realistically rendering the content such that the shadows cast, light emitted, and light reflected by content from one process may affect the appearance of other content from the same and/or other processes.

Example Systems

Figure 1:
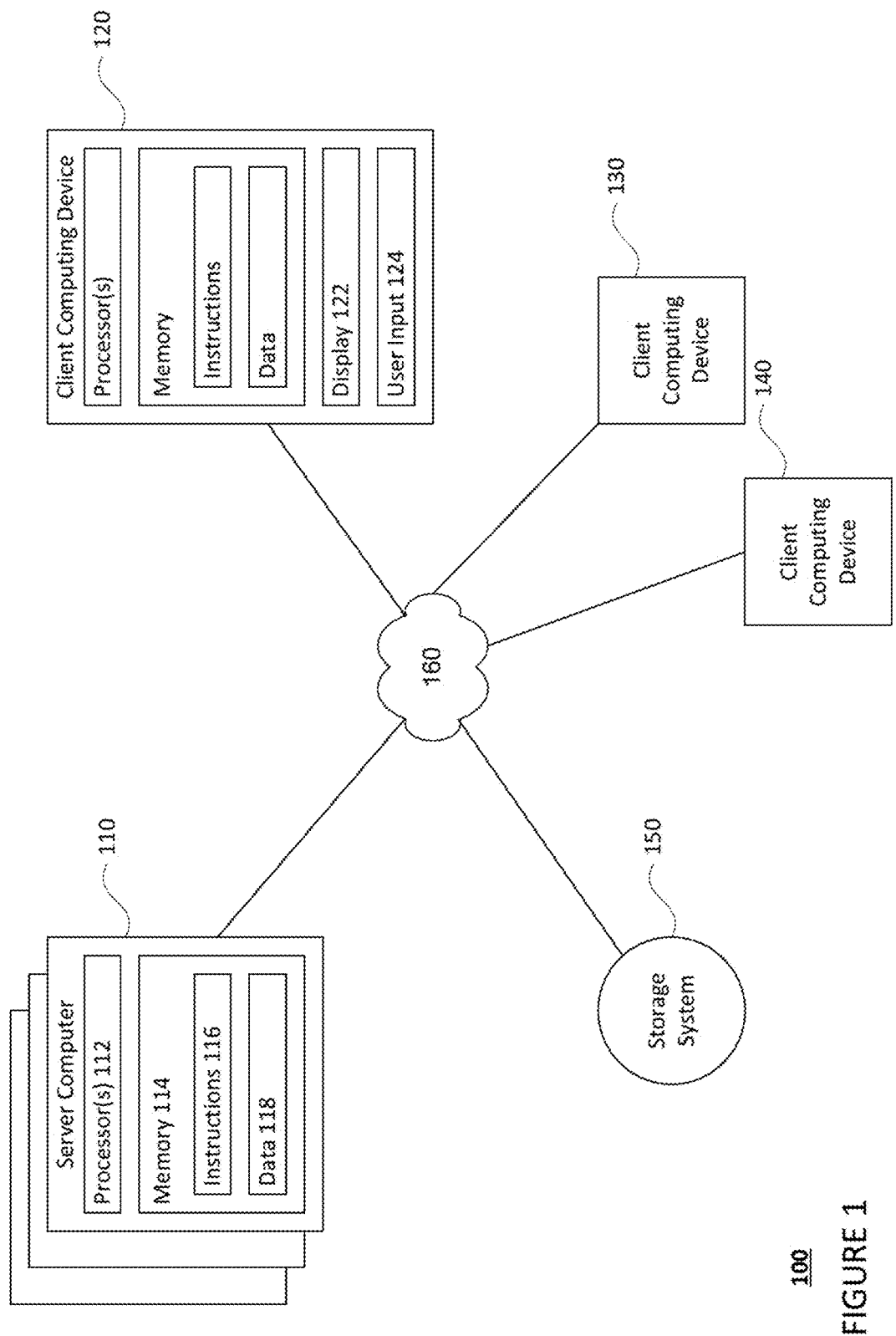
FIG. 1 is a functional diagram of an example system in accordance with aspects of the disclosure.
Figure 2:
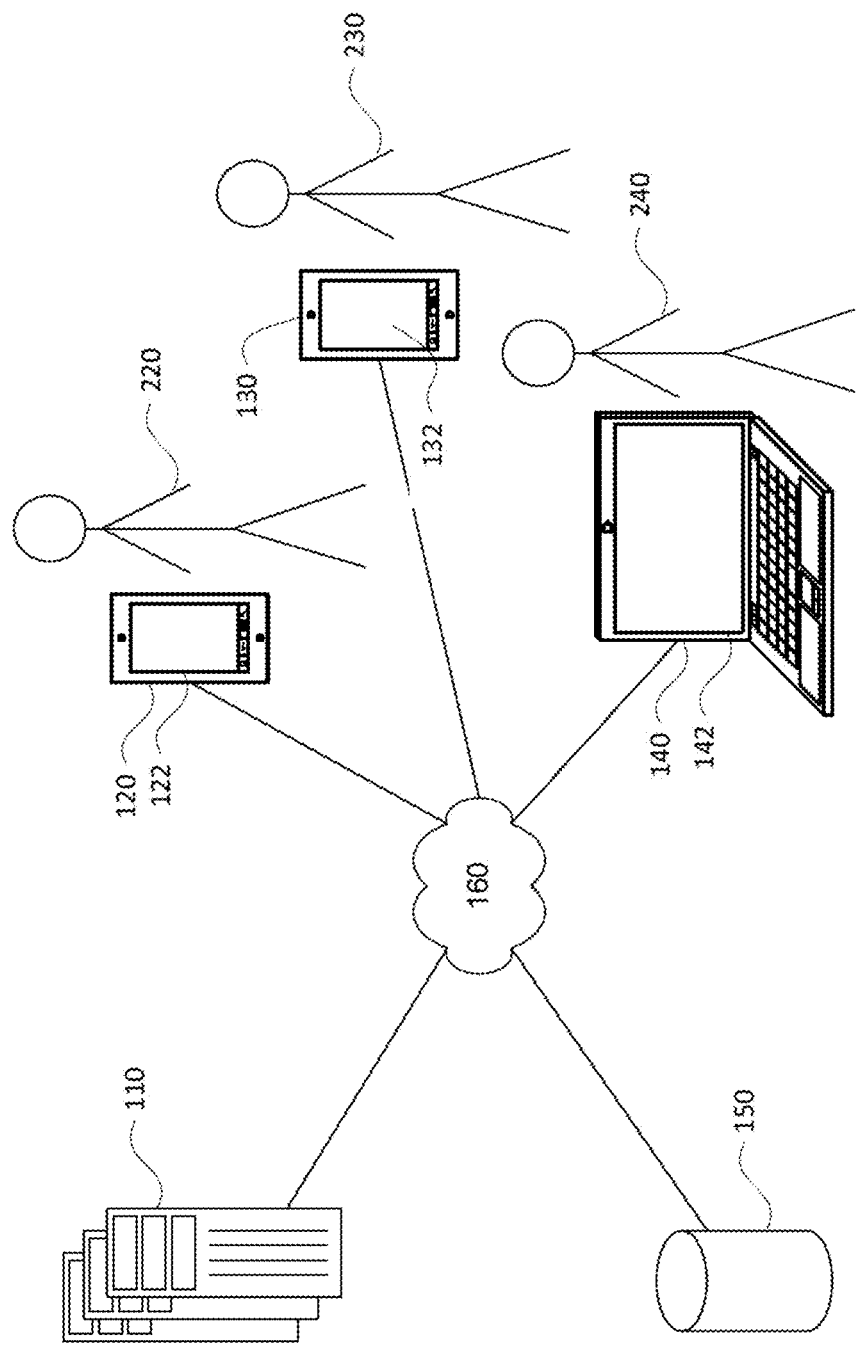
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, 130, and 140 as well as storage system 150. Each computing device may contain one or more processors 112, memory 114 and other components typically present in general purpose computing devices. Memory 114 of each of computing devices 110, 120, 130, and 140 may store information accessible by the one or more processors 112, including instructions 116 that can be executed by the one or more processors 112.

The memory may store data that can be retrieved, manipulated or stored by one or more processors. The memory may be of any non-transitory type capable of storing information accessible by the processor, such as a hard-drive, memory card, ROM, RAM, DVD, CD-ROM, a tape drive, write-capable, and read-only memories. Data elements, such as instructions 116 and data 118, may be held in memory spaces. For example, a graphics processing unit has several memory spaces including: registers, constants, indexable shared local memory, global device memory, local memory, stack memory, parameter memory, and texture memory. Each of these memory spaces may have different properties including different latency, size, concurrent access restrictions relative to the current processing element which, if any, processing elements can access this memory space, random access and indexability defining whether data can be accessed by an index or handle and for what purpose, writability, bandwidth, and access pattern penalties such as bank conflicts, coalescing, cache misses, partition camping, etc. The registers may be directly accessible by processors in a multiprocessor.

The instructions 116 may be any set of instructions to be executed directly, such as machine code, or indirectly, such as scripts, by the one or more processors. In that regard, the terms "instructions," "kernels," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. In some instances, data may include scene graphs and the objects associated therewith, including resources.

The one or more processors 112 can be any conventional processors, such as a commercially available CPU. Alternatively, the processors can be dedicated components such as an application specific integrated circuit ("ASIC") or other hardware-based processor.

The one or more of computing devices 110, 120, and 130 may include specialized hardware components to perform specific computing processes in parallel, such as rasterizing, compositing, and otherwise manipulating vector graphics faster or more efficiently. For instance, the one or more graphics processing units 113 ("GPU") may be any conventional graphics processing units. Additionally, the one or more GPUs may be single instruction, multiple data (SIMD) devices, single instruction, multiple thread devices (SIMT).

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, 130, and 140 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. For instance, two or more computing devices, such as computing devices 110, may communicate through a peer-to-peer communication protocol, with or without the use of an intermediate server. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices, and may perform all or some of the features described herein.

Each of the client computing devices 120, 130, and 140 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of exchanging data with a server, such as server computing device 110, over a network such as the Internet and/or computing devices capable of exchanging data with other computing devices, such as over a network. By way of example only, client computing device 120 may be a mobile phone, wearable device or a device such as a wireless-enabled PDA, a tablet PC, or a netbook that is capable of obtaining information via the Internet. In another example, client computing device 130 may be a tablet computer or camera. In an additional example, client computing device 140 may be a laptop computer. As an example the user may input information using a small keyboard, a keypad, microphone, using visual signals with a camera, or a touch screen. Although not shown, the computing devices may be augmented reality and/or virtual reality headsets.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Example Methods

Figure 4:
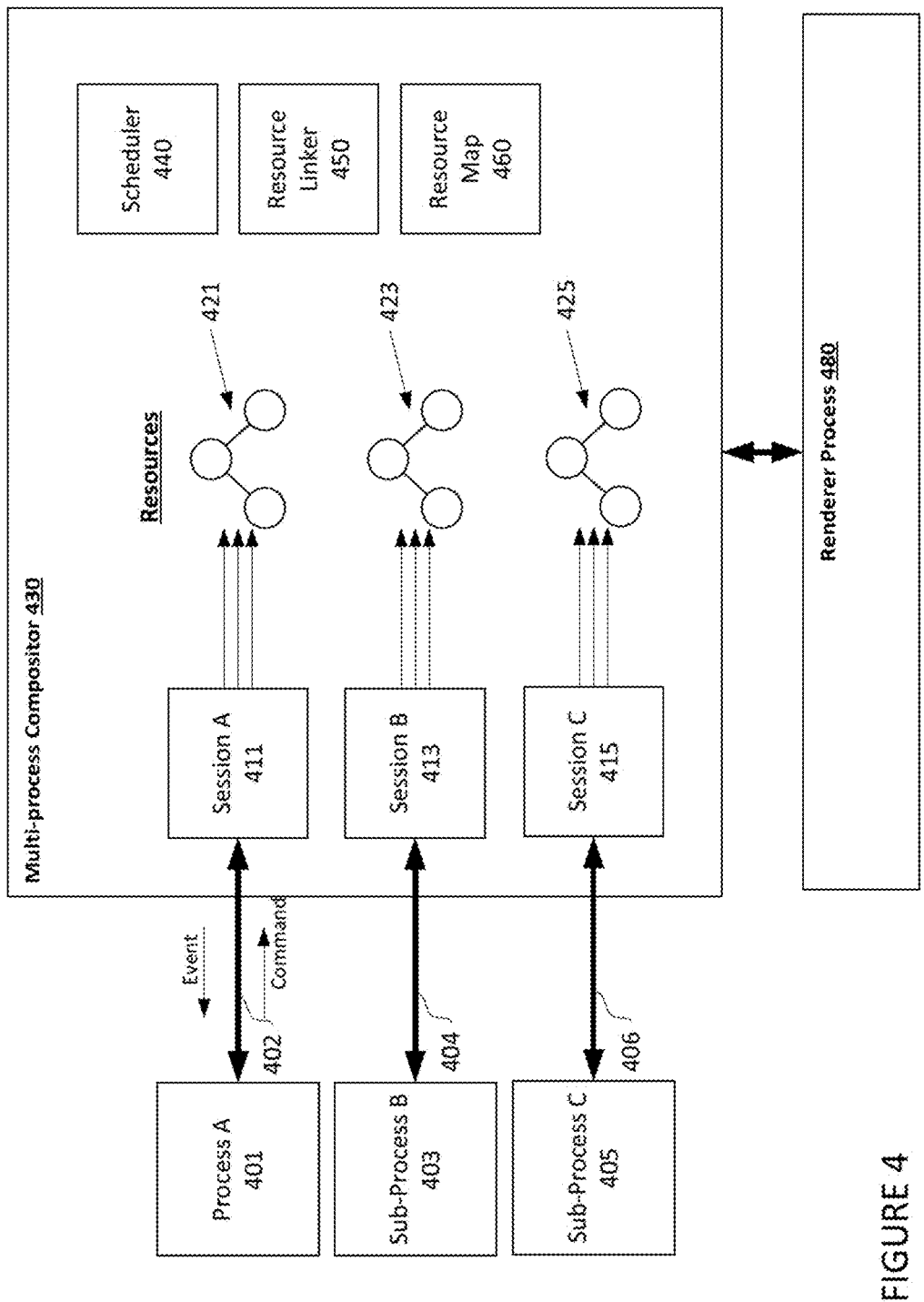
FIG. 4 is a communication architecture between processes and a multi-process compositor in accordance with aspects of the disclosure.

One or more processes instruct the multi-process compositor to generate one or more global scene graphs. In this regard, the multi-process compositor may be loaded by a computing device along with one or more processes. The processes may be privileged processes, herein referred to as head processes or just processes, which may be capable of defining the processes and sub-processes which may interact with each respective resource. Sub-processes are any processes which are not head processes. For instance, as shown in FIG. 4, process A 401, which may be a head process, and sub-processes B 403 and sub-process C 405, may be loaded by a computing device, such as computing device 101, as shown in FIG. 4. Multi-process compositor 430 may also be loaded by the computing device, as further shown in FIG. 4.

Each process, including head processes and sub-processes, must establish a session through a session channel in order to interact with the multi-process compositor. A session channel may define a bi-directional communication channel, such as an inter-process communication channel (IPC), through which commands and events may be communicated to and from the multi-process compositor by a respective process. In some instances, the communication channel may be uni-directional, with either the multi-process compositor or processes being able to send commands and/or events through the channel.

The communication channel may be generated by providing the process and its respective session with an end-point. In this regard, for each communication channel, two end-points may be generated, with one end-point being provided to a process and the other to the multi-process compositor. The end-points may be generated and provided to the processes and multi-process compositor through an external service. The external service may be a program within the operating system, such as a kernel. For each end-point that is received by the multi-process compositor, that end-point may be stored in a session corresponding to the session established with the process which has the other, corresponding end point.

For instance, process A 401 may establish a session A 411 in the multi-process compositor 430. Communication between the session A 411 and process A 401 may occur through communication channel 402, where both the session and the process have a respective end-point. Similarly, sub-process B 403 may communicate with session B 413 through communication channel 404 and sub-process C 405 may communicate with session C 415 through communication channel 406, as further shown in FIG. 4. The instantiation of session B 143 and session C 415 may be the result of commands provided by process A 401 to the multi-process compositor 430, as described here.

Each session may contain a resource map. The resource map may include identification values of respective processes assigned to nodes, and resources associated therewith, to allow for identification and access of that node and/or resource. For instance, the multi-compositor 430 may include a resource map 460 which maps each resource, such as the resources 421, 423, and 425 with their respective nodes and processes (i.e., process A 401, sub-process B 403, and sub-process C 405, respectively.)

Upon establishing a communication channel, commands and events may be sent from one end point of a session to a process and vice-versa. For example, process A 401 may provide commands, such as generating a first set of resources 421 to the multi-process compositor 430 through the communication channel 402 between process A 401 and session A 411 and, as further shown in FIG. 4. Similarly, sub-processes B and C, 403 and 405, may provide resources 423 and 425. Each command may include an identification value such that the resource map may correctly coordinate the delivery of a resource to a respective node.

Figure 5:
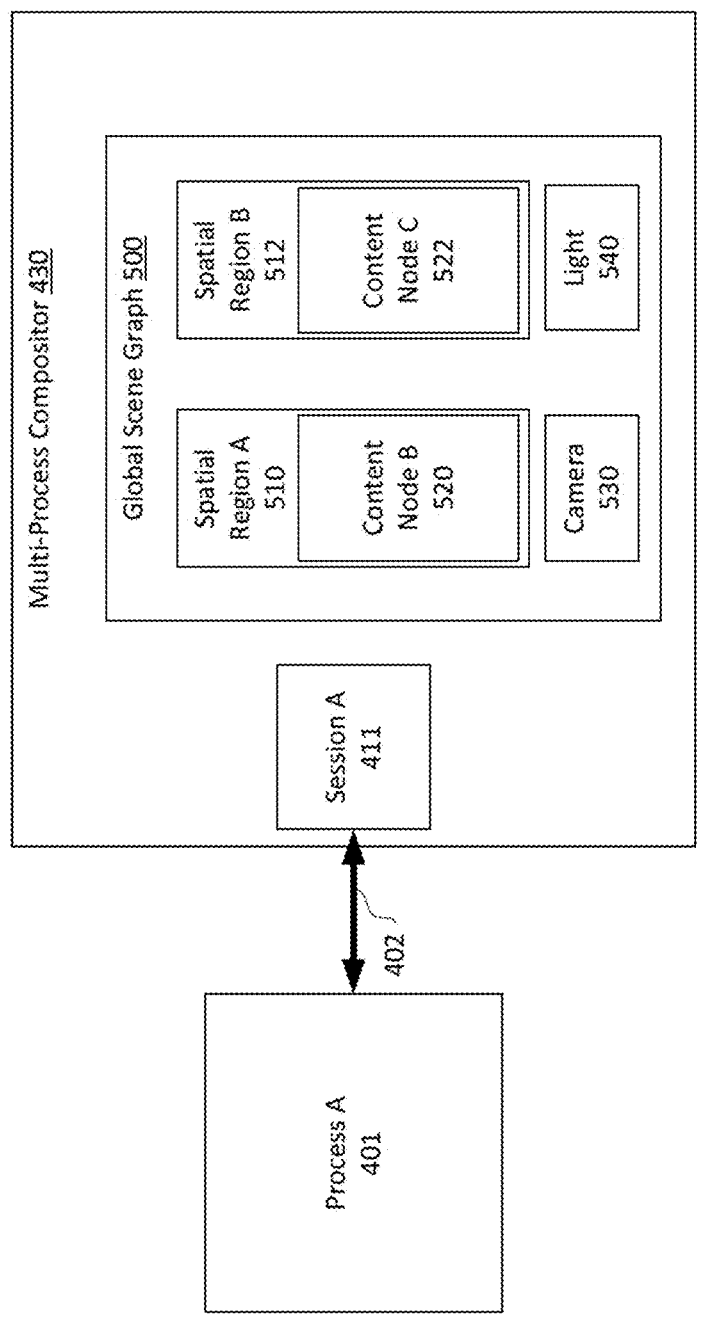
FIG. 5 is an example illustration of a head process generating a global scene graph within a multi-process compositor in accordance with aspects of the disclosure.

Head processes, such as process A 401, may define the nodes and arcs of the global scene graph. In this regard, creating and manipulating resources within the global scene graph may be based on commands received from the head process of the global scene graph, although more than one head process may be used. For instance, as further shown in FIG. 5, head process A 401 may send commands to through communication channel 402 to session A 411, instructing the multi-process compositor 430 to generate nodes corresponding to resources such as a camera 530, light 540, spatial regions 510 and 512, and content nodes B and C 520 and 522 within a scene graph 500.

In some instances, a process, such as process A 401 may provide commands to the multi-process compositor to ignore or otherwise disallow certain commands. For instance, process A 401 may issue commands that instruct the multi-process compositor 430 to ignore any commands from other processes which request further node generation. In another instance, the multi-process compositor 430 may receive a command instructing the multi-process compositor 430 to accept and/or disallow a subset of one or more commands, thereby limiting the functionality of the multi-process compositor.

In some instances, the head process may provide commands to the multi-process compositor to request further commands from other sub-processes to define the global scene graph, such as providing requested content or generating additional nodes. As each process and sub-process may be restricted to only certain portions of the global scene graph based on the commands provided by the head process, a layer of security is provided as each session is prevented from searching, traversing, discovering, or otherwise manipulating content or resources owned by other processes in the global scene graph.

For instance commands received by session A 411 in the multi-process compositor 430 from process A 401 may requests that sub-process B 403, provide further commands to the define the global scene graph. In this regard, sub-process B 403 may generate additional nodes to the scene graph, such as global scene graph 500. In some instances, other sub-process may be provided access to generate additional nodes assigned to other sub-processes, such as sub-process B 403 defining other nodes to sub-process C 405 or another such sub-process. These other sub-process may also define the global scene graph if the head process or sub-process which assigned the nodes to the other sub-process does not prevent such actions or grants such access through commands provided to the multi-process compositor 430.

Figure 6:
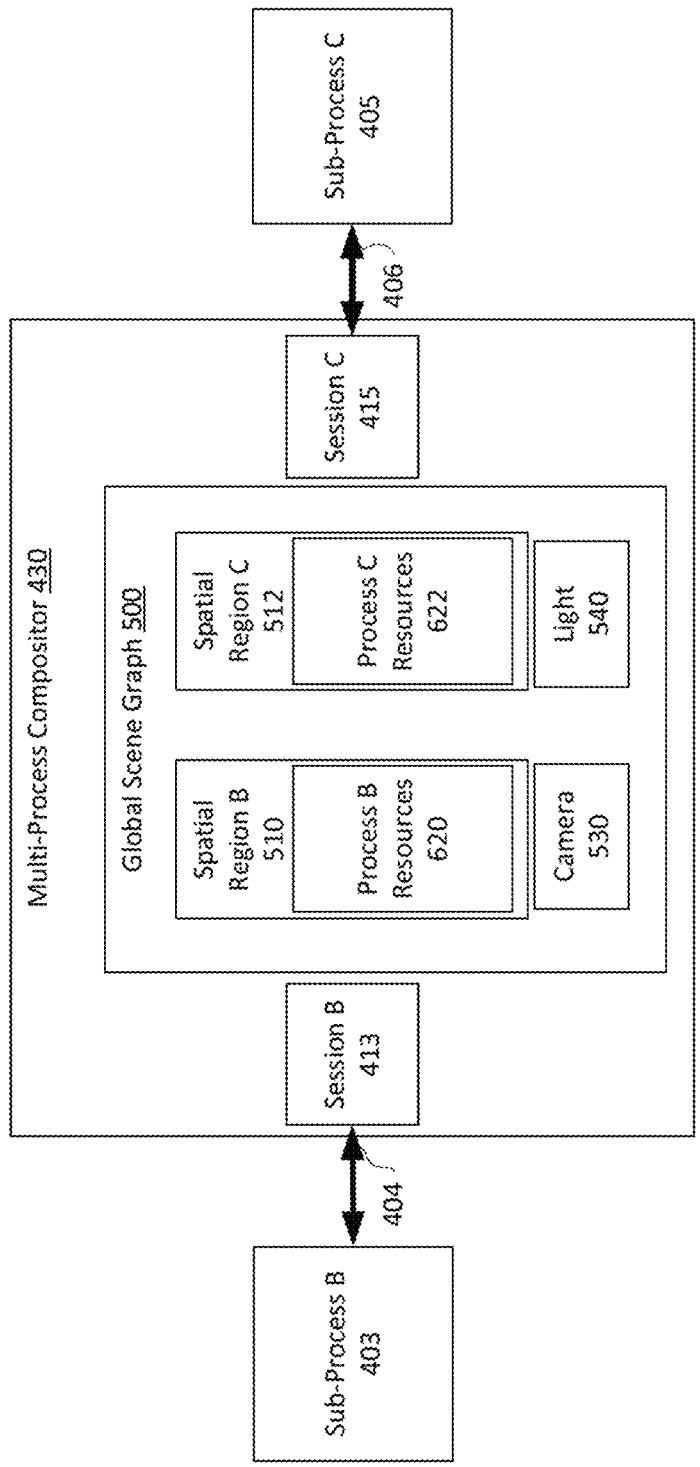
FIG. 6 is an example illustration of sub-processes providing resources to a global scene graph in accordance with aspects of the disclosure.

The multi-process compositor may request sub-processes provide resources for each node assigned to each respective sub-process. For instance, continuing the above example, sub-processes B 403 and sub-process 405 may receive requests, or may automatically supply, resources 620 and 622 for content nodes B and C 520 and 522 within a scene graph 500. The requests for, and providing of, resources 620 and 622 may occur through communication channels 404 and 406, as further shown in FIG. 6. In this regard, sub-process B may provide resource 620 to session B 413 and sub-process C may provide resource 622 to session 415.

Import and export sessions may be generated to enable multiple processes the ability to interact with the same global scene graph and share resources. In this regard, upon a node being generated which requires content from a process, including sub-processes, the multi-process compositor may generate a security token which may then be passed to the sub-process which is assigned to provide the resources for that node. The security token may provide the process with an import/export session that provides the ability to import or export, respectively, content out of or into the resource and/or perform other tasks assigned to the sub-process. The security token may be an event-pair that is not easily forged or guessed.

In some instances, the security token may be generated by a resource linker subsystem of the multi-process compositor. The resource linker subsystem may receive a command from the multi-process compositor that a node was created which requires a resource from another process or sub-process. In response, the resource linker may generate an event-pair security token. For instance, referring back to FIG. 4, a resource linker 450 may handle the security token generation for allowing process A 401, sub-process B 403, etc., to share resources amongst each other.

Figure 7:
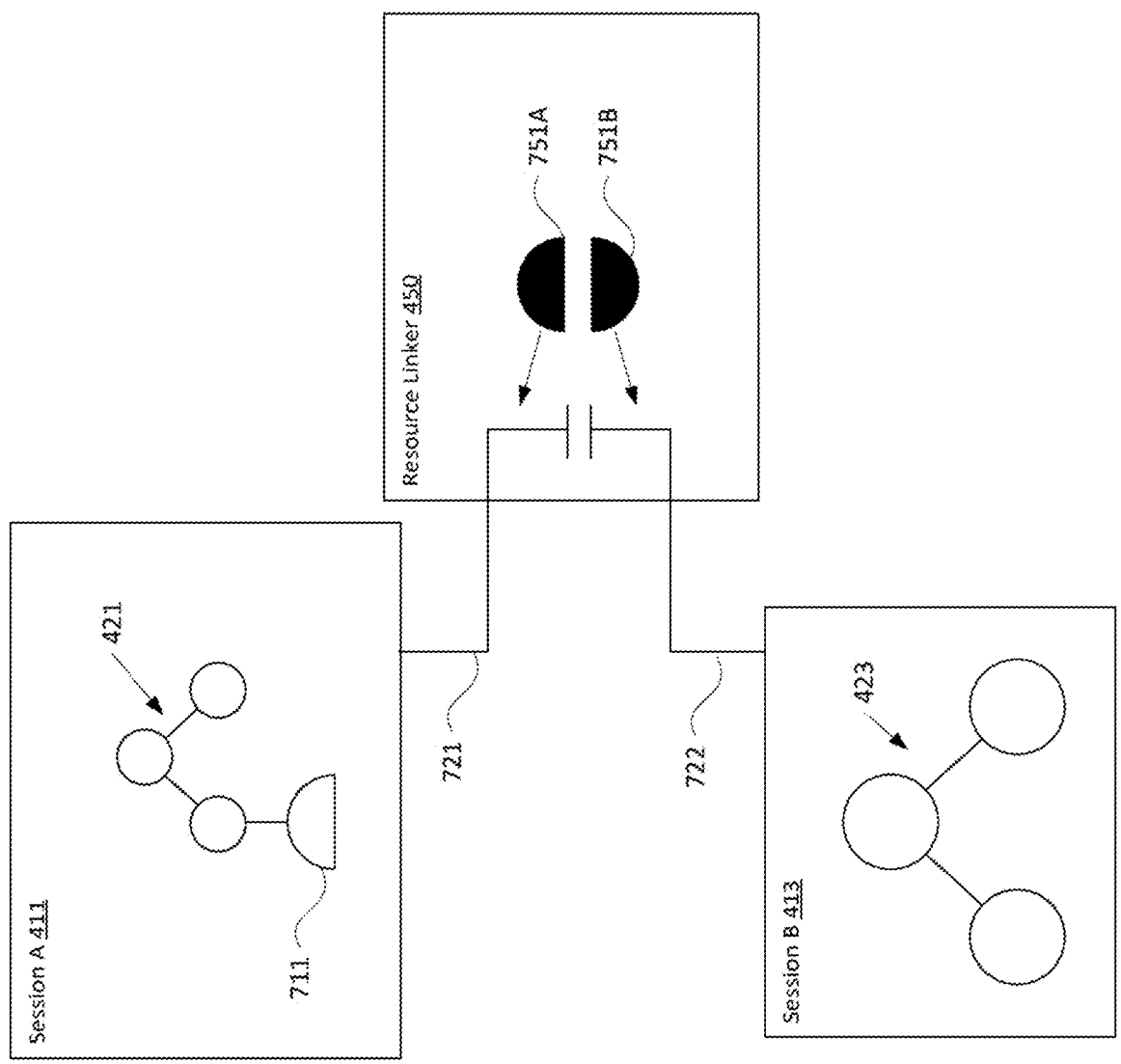
FIG. 7 is an illustration of sharing resources between processes in accordance with aspects of the disclosure.
Figure 8:
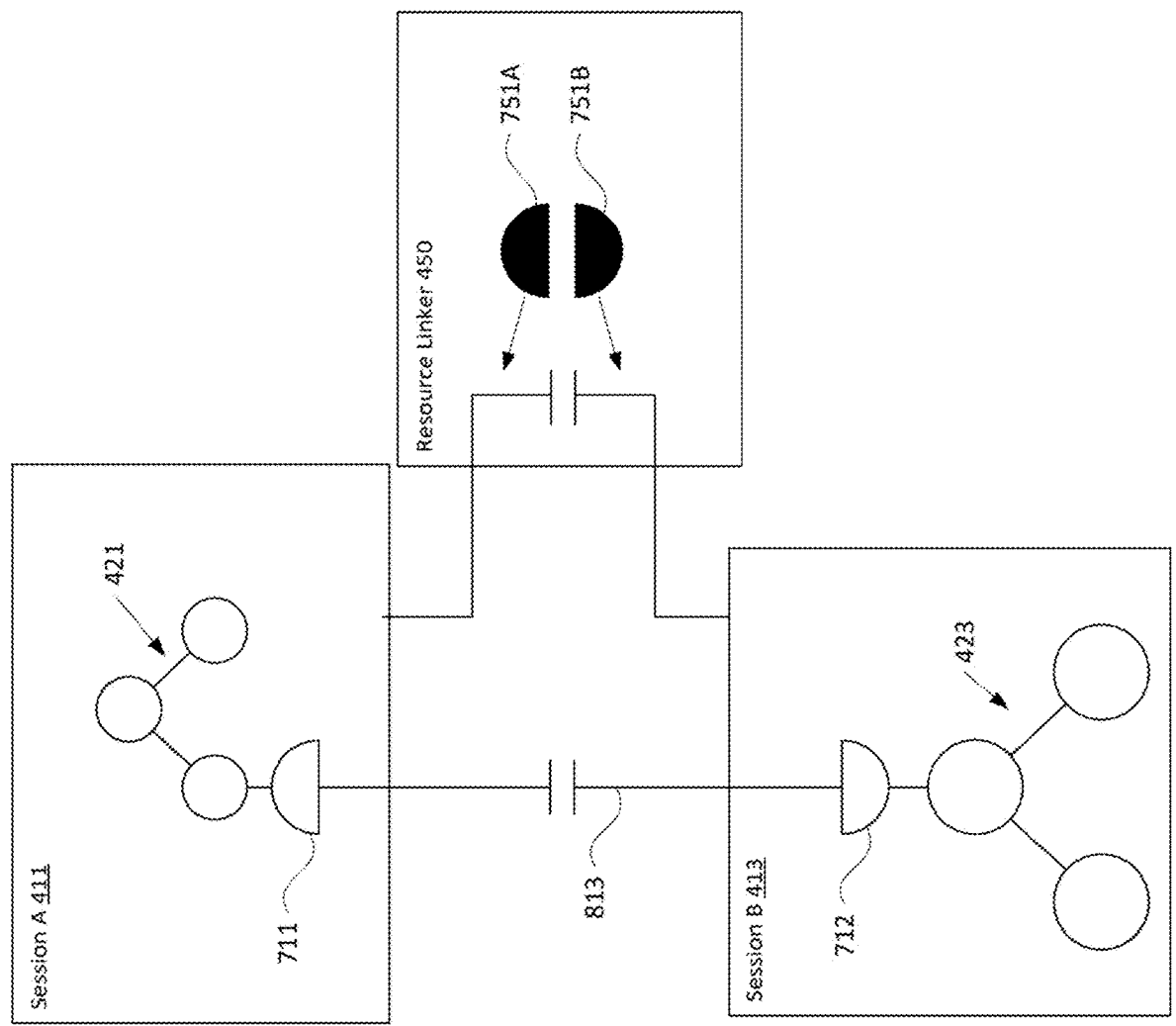
FIG. 8 is a further illustration of sharing resources between processes in accordance with aspects of the disclosure.

An example illustration of resource sharing through an import and export sessions is illustrated in FIGS. 7 and 8. Referring first to FIG. 7, Session A 411 may be associated with resources 421 and session B 413 may be associated with resources 423. Session A 411 may then receive a request to import a resource from session B 413, as illustrated by the space holder node 711. Upon generating the space holder node 711, the resource linker 450, through a channel 721, may receive notification that a space node is needed from session B 413. In response, the resource linker may create and share the event-pair token comprised of 751A and 751B to session A 411 and session B 413, respectively through channels 721 and 722. Session B 413 may receive the event-pair token 751B and create a space node 712. Upon creating the space node, session B 413 may provide the resource linker 450 with the event-pair token 751B, the resource location, and the resource type.

Process A 401 may export a request that sub-process B provide a resource for a content node. In response, the resource linker 450 may generate and provide an event-pair token to process A 401 and sub-process B 403. Sub-process B 403 may then import its respective portion of the event-pair token 451B, along with the resource (i.e., the space node 712), as shown in FIG. 8. A linking arc 813 may then be created in the scene graph connecting the space holder node 711 and the space node 712. Accordingly, the linking arc 813 may be created in the scene graph without process A 401 or sub-process B 403 being in direct communication, thereby providing a security barrier between the processes. In some instances, the import of a resource type, so that the receiving process knows which API to use to read and/or otherwise manipulate the resource.

In some instances, the resource linker 450 may receive notifications from a session that a space node has been created, but for which no corresponding space holder node has been generated. In this instance, the resource linker 450 may store the space node's information for future use or request a session generate a corresponding space holder node.

Although the security token is described in the foregoing examples as an event-pair, any type of security token may be used. In some instances the security token may be provided by a kernel, as described above with regard to generating sessions. Moreover, the security token may be any other type of security, such as public key cryptography keys or the like.

Figure 9:
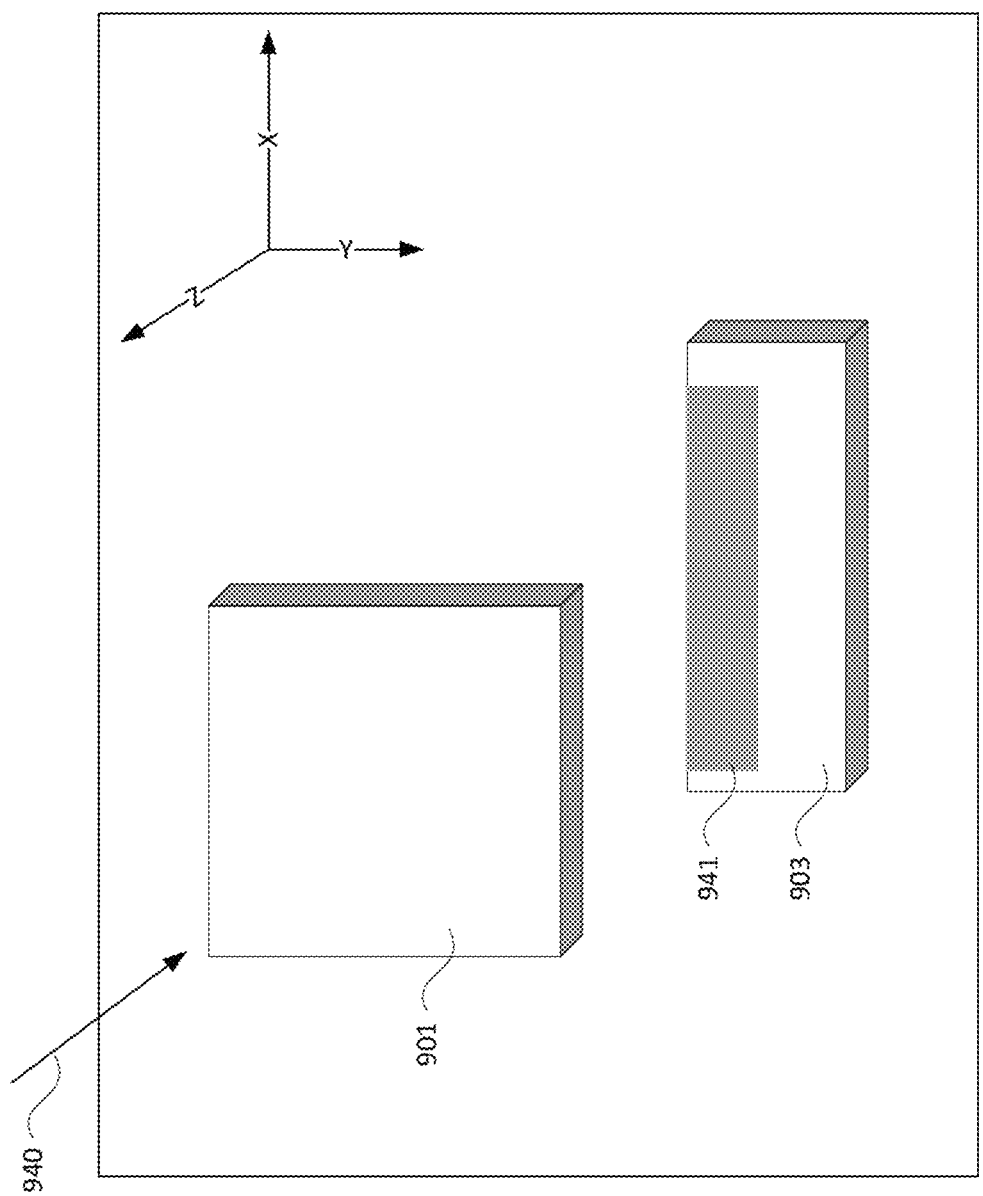
FIG. 9 is an illustration of a rendered scene graph in accordance with aspects of the disclosure.

The global scene graph may be rendered and output for display. FIG. 9 illustrates the output of the global scene graph 500. In this regard, the content provided by sub-process B 403 may be a cube 901 and the content provided by sub-process C 405 may be a rectangular cuboid 903. The lighting resource 540 may define the light coming from the direction of the arrow 940 and the camera 530 may be positioned such that it provides a view from the Y direction, as further illustrated in FIG. 9.

As discussed herein, the renderer used by the multi-process compositor may be a physically based renderer. As such, the shadows cast, light emitted, and light reflected by content from one process may affect the appearance of other content from the same and/or other processes. As illustrated in FIG. 9, the light resource 540 may result in a shadow 941 being cast from the cube 901 provided by sub-process B 403 onto the rectangular cuboid 903 provided by sub-process C 405 when viewed from the perspective of the camera resource 530 also created by head process A 401.

Figure 10:
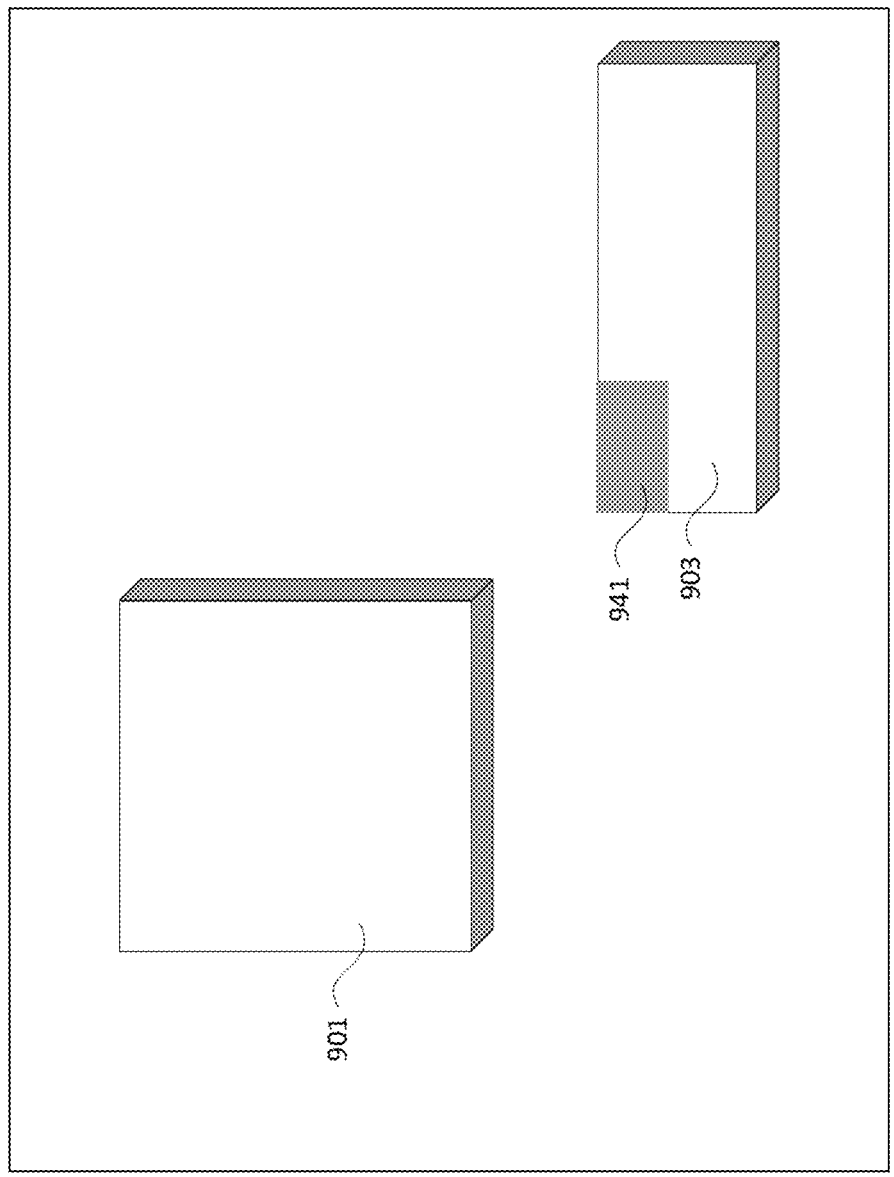
FIG. 10 is an illustration of a rendered scene graph in accordance with aspects of the disclosure.

The global scene graph may be updated in real-time, such that changes to resources in the global scene graph through commands or events may be rendered. For instance, a user, process, or sub-process may generate an event such as by moving the rectangular cuboid 903, as shown in FIG. 10. Upon the rectangular cuboid 903 being moved, the multi-process compositor 430 may render the rectangular cuboid 903 in the new position, where the shadow 941 from the cube 901 on the surface of the rectangular cuboid 903 has changed.

The multi-process compositor may only require processes and sub-processes provide content when there are changes to a resource. In instances where there are no changes to a resource or consistent changes to a resource, the process or sub-process providing the content for the resource may go to sleep. For instance, if the cube 901 provided by sub-process B 403 is configured to rotate at a rate of one rotation a minute, the multi-process compositor 430 may store this information and automatically render the frames of the cube 901 without having to continually request sub-process B 403 provides the content in an updated position. As such, the sub-process may go to sleep until a request for updated content is requested by the multi-process compositor.

In some instances, the multi-process compositor may pass rendering to an external rendering process, such as renderer process 480 as shown in FIG. 4. By moving rendering from a process internal to the multi-process compositor 430 to an external process, an additional security boundary may be formed. The additional boundary may between the multi-process compositor 430 and the renderer process 480 may enable the capabilities of the renderer process to be minimized such that it may be denied access to the network and to persistent file-systems. As such, access to the renderer process 480 may be difficult for malicious actors. In the event a malicious actor is able to access the renderer process 480, the amount of damage that can be done to the multi-process compositor 430 is minimal, as communication with the renderer process may through an API having limited communication channels, if any, with the multi-process compositor 430.

In some instances, images rendered by the multi-process compositor or external rendering process may be displayed on a device that is not part of the computing device where the rendering occurs. For instance, the display may be an augmented reality or virtual reality headset capable of displaying rendered images, such as a stream of video. The computing device which performs the rendering may be a personal computer, cellular phone, tablet, or other such device. The computing device may stream, via a wired or wireless connection, the rendered images to the headset for display. In some instances, the display may accept rendered video from more than one source, such as more than one computing device.

Referring back to FIG. 4, the multi-process compositor may also include a scheduler 440. The scheduler 440 may schedule frames to be rendered. In some instances the scheduler 440 may schedule other work that the multi-process compositor 430 must do at a specific time, or before a specific time period is reached.

Although the examples contained herein describe the use of a single global scene graph, more than one global scene graph may be implemented. For instance, a first global scene graph may be assigned to a first display device and a second global scene graph may be assigned to a second display device. In some instances multiple global scene graphs may be assigned portions of a single display. Moreover, displays may be virtual. For instance, a virtual display comprised of a global scene graph may be embedded within the display of another global scene graph.

The multi-process compositor may also provide localized sound. For instance, the multi-process compositor may receive a song or other sound from a process for placement in the global scene graph. In this regard, the global scene may contain a virtual speaker resource, to which the sound may be provided. Upon rendering, the multi-process compositor, or other program or API, may determine where the virtual speaker resource is relative to the rendered video. The multi-process compositor or other program or API may then play the sound from a speaker or speakers relative to the location of the virtual speaker resource. In some instances, the sound from the virtual speaker may be muted or attenuated, such as when other audio is being played (e.g., when an incoming phone call is received.)

Figure 11:
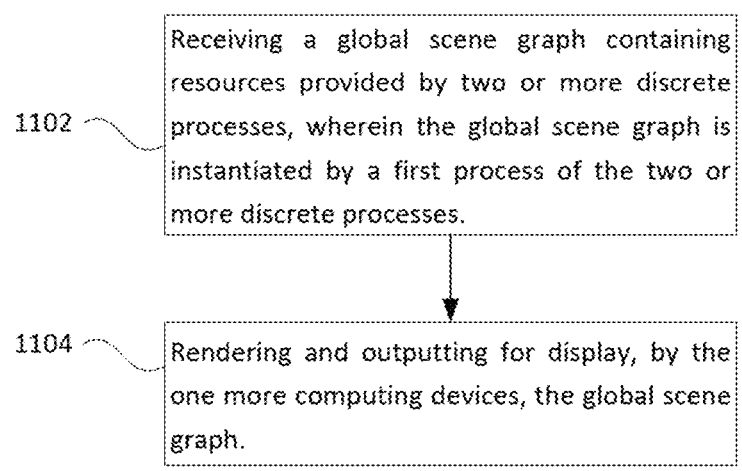
FIG. 11 is a flow diagram in accordance with aspects of the disclosure.

FIG. 11 illustrates a flow 1100 of a multi-process compositor rendering a global scene graph. In this regard, at block 1102 one or more computing devices, such as computing device 110, may receive a global scene graph containing resources provided by two or more discrete processes, wherein the global scene graph is instantiated by a first process of the two or more discrete processes. At block 1104, the one or more computing devices may render and output for display the global scene graph in accordance with the resources contained therein.

In some instances, the virtual speaker may be associated with other content, such as an animation. For example, in virtual reality, the audio from an incoming call may be associated with an animation of a humanoid 3D avatar or other such graphic. As such, when sound is received during the call, the avatar's mouth may move and sound may be output from a speaker or speaker relative to the avatar's location in the rendered video.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method of controlling a multi-process compositor to generate one or more global scene graphs, the method comprising:
    loading, by one or more computing devices, a plurality of processes and the multi-process compositor;
    generating, by the one or more computing devices for each respective one of the plurality of processes, a respective first end-point for a respective communication channel that is provided to the respective one of the plurality of processes;
    generating, by the one or more computing device, a respective second end-point for the respective communication channel that is provided to the multi-process compositor;
    establishing, by the one or more computing devices for each respective one of the plurality of processes, a session in the multi-process compositor through the respective communication channel; and
    sending, by the one or more computing devices, commands from the respective first end-point to the respective second end-point.

2. The method of claim 1, further comprising storing each respective second end-point in a session corresponding to the respective one of the plurality of processes which has the respective first end-point.

3. The method of claim 1, wherein the session includes a resource map.

4. The method of claim 3, wherein the resource map includes identification values of respective ones of the plurality of processes assigned to nodes, and resources associated therewith.

5. The method of claim 1, wherein the multi-process compositor includes a resource map which maps each resource of a plurality of resources with respective nodes and processes associated with the resource.

6. The method of claim 1, wherein the commands instruct the multi-process compositor to generate a set of resources.

7. The method of claim 1, wherein the commands instruct respective ones, of the plurality of processes to generate a set of resources.

8. The method of claim 1, wherein the commands instruct the multi-process compositor to generate nodes corresponding to resources.

9. The method of claim 1, wherein the commands instruct the multi-process compositor to ignore or disallow certain commands.

10. The method of claim 1, wherein each of the commands includes an identification value such that a resource map can correctly coordinate a delivery of a resource to a respective node.

11. The method of claim 1, wherein the plurality of processes include one or more head processes that define nodes and arcs of a global scene graph.

12. A system for generating one or more global scene graphs, the system comprising:
one or more computing devices configured to:
load a plurality of processes and a multi-process compositor;
generate, for each respective one of the plurality of processes, a respective first end-point for a respective communication channel that is provided to the respective one of the plurality of processes;
generate a respective second end-point for the respective communication channel that is provided to the multi-process compositor;
establish, for each respective one of the plurality of processes, a session in the multi-process compositor through the respective communication channel; and
send commands from the respective first end-point to the respective second end-point.

13. The system of claim 12, wherein the multi-process compositor stores each respective second end-point in a session corresponding to the respective one of the plurality of processes which has the respective first end-point.

14. The system of claim 12, wherein the session includes a resource map.

15. The system of claim 14, wherein the resource map includes identification values of respective ones of the plurality of processes assigned to nodes, and resources associated therewith.

16. The system of claim 12, wherein the multi-process compositor includes a resource map which maps each resource of a plurality of resources with respective nodes and processes associated with the resource.

17. The system of claim 12, wherein the commands instruct the multi-process compositor to generate a set of resources.

18. The system of claim 12, wherein the commands instruct respective ones of the plurality of processes to generate a set of resources.

19. The system of claim 12, wherein the commands instruct the multi-process compositor to generate nodes corresponding to resources.

20. The system of claim 12, wherein the commands instruct the multi-process compositor to ignore or disallow certain commands.

\* \* \* \* \*